Figure 1:
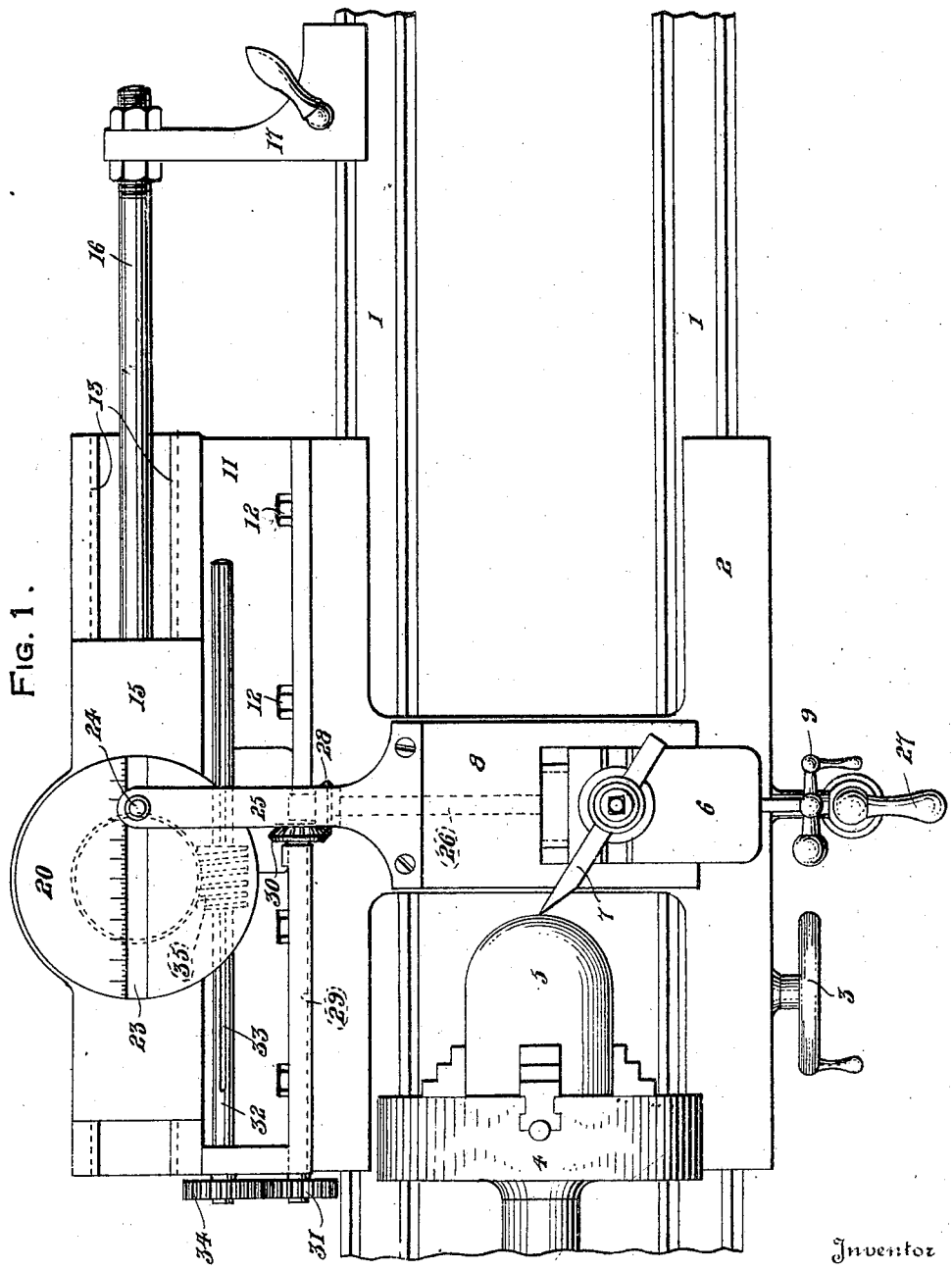

Feb. 26, 1924.

W. DZUS

LATHE ATTACHMENT

Filed July 20, 1922

1,485,258

2 Sheets-Sheet 1

Inventor
W. Dzus

By F. K. Bryant
Attorney

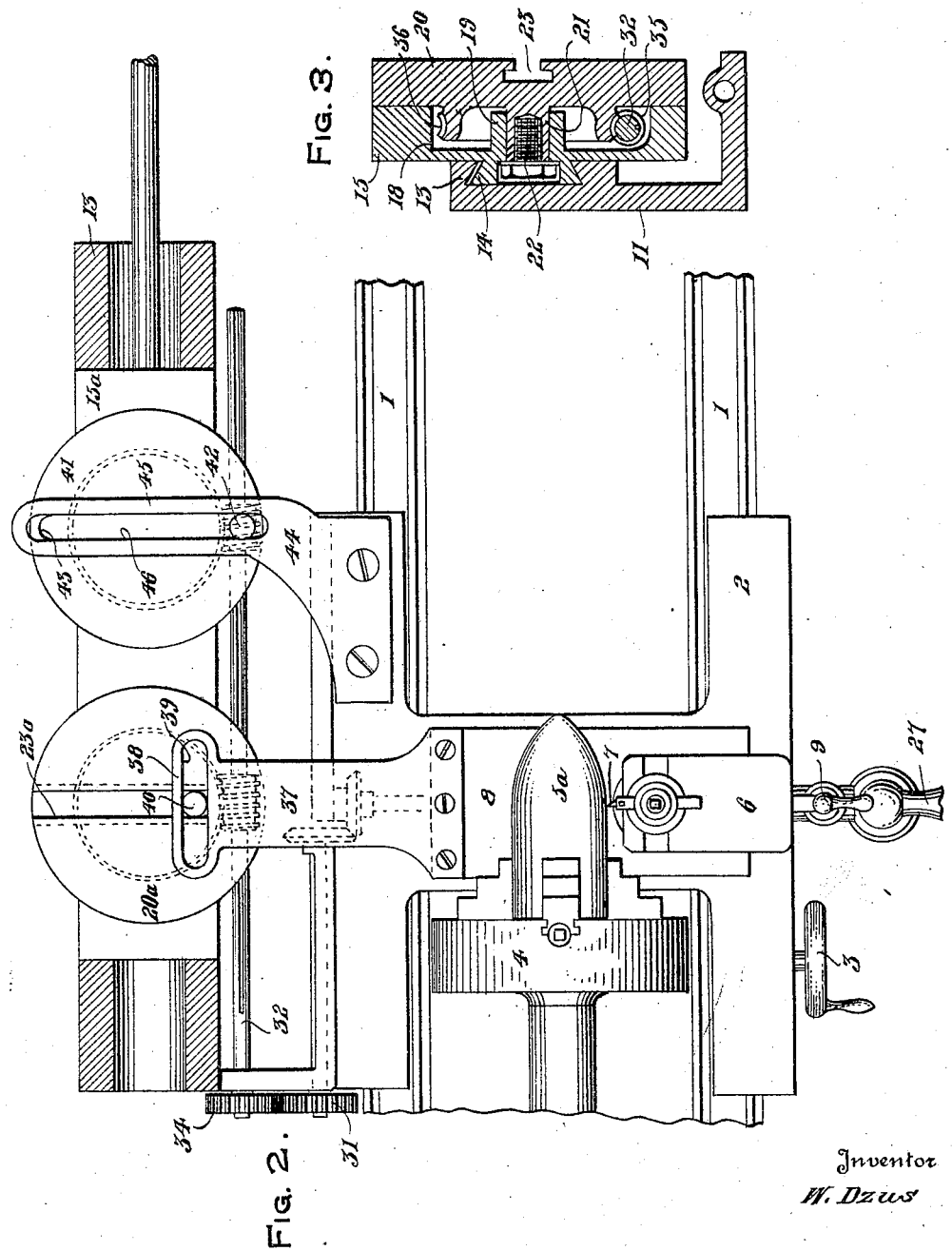

Patented Feb. 26, 1924.

1,485,258

UNITED STATES PATENT OFFICE.

WILLIAM DZUS, OF SARANAC LAKE, NEW YORK, ASSIGNOR OF THIRTY PER CENT TO G. M. RICHARDSON, OF SARANAC LAKE, NEW YORK.

LATHE ATTACHMENT.

Application filed July 20, 1922. Serial No. 576,350.

*To all whom it may concern:*

Be it known that I, WILLIAM DZUS, a citizen of Ukraine, residing at Saranac Lake, in the county of Franklin and State of New York, have invented certain new and useful Improvements in Lathe Attachments, of which the following is a specification.

This invention relates to certain new and useful improvements in lathe attachments, and has particular reference to the provision of a device capable of association with a lathe of ordinary construction for performing round, oval or arcuate cutting operations upon an object in either concave or convex formation.

An object of the invention is to provide an attachment for a lathe of ordinary construction wherein the tool rest is transversely slidable relative to the lathe carriage with devices for simultaneously transversely shifting the tool rest, and longitudinally shifting the lathe carriage to vary the position of the cutting tool relative to the work being operated upon, either for cutting a concave or convex surface.

The invention further embodies in a lathe attachment of the type above set forth, the provision of manually operated power devices for shifting a tool rest and lathe carriage, the attachment embodying an adjustable member for controlling the movement of the tool rest and carriage.

The invention further contemplates the cutting of elongated tapering elements, substantially in the form of a cone with the length thereof being greater by varying degrees than the width of the member, the attachment for the lathe in this form of the invention providing a greater speed of movement of the tool rest in one direction of movement thereof.

With the above objects in view and others that will appear as the nature of the invention is better understood, the same consists of the novel form, combination and arrangement of parts hereinafter more fully described, illustrated in the accompanying drawings and pointed out in the appended claims.

In the drawings, wherein like reference characters designate corresponding parts throughout the several views, Figure 1 is a fragmentary top plan view of a lathe with the attachment constructed in accordance with the present invention, the attachment illustrated being of the type for cutting circular convex or concave bodies, Figure 2 is a fragmentary top plan view of a modified form of the invention showing the attachment for the lathe for cutting elongated oval-shaped or cone-shaped members, and Figure 3 is a detail sectional view showing a portion of the lathe attachment.

Referring more in detail to the accompanying drawings, and particularly to Figures 1 and 3 there is illustrated a lathe embodying side rails 1 supporting a longitudinally shiftable carriage 2 that is ordinarily operated by the hand wheel 3, the lathe being provided with a chuck 4 for supporting a piece of work 5.

A rest 6 supporting a tool 7 is adjustably connected to the shifter 8 by the handle clamps 9, the shifter 8 slidably mounted transversely of the carriage 2 in the usual manner.

The attachment for the lathe embodies a laterally positioned table 11 secured as at 12 to one side of the carriage 2, the table 11 being provided with a longitudinally extending guide way 13 for the sliding reception of the depending dovetailed shaped block 14 carried by the plates 15 as clearly shown in Figure 3. The plate 15 is adjustably connected to the lathe rail 1 by the longitudinally extending rod 16 carrying a clamp 17 upon the outer end thereof that engages the lathe rail as shown in Figure 1. The upper face of the plate 15, as shown in Figure 3, is provided with an annular groove 18 and a central hollow stud bearing 19, a disk 20 carrying a depending internally threaded apertured stud 21 that rotatably extends into the bearing stud 19 to be secured therein by the headed screw 22. The upper face of the disk 20 is provided with a transverse groove 23 into which a pin 24, carried by the shifter extension arm 25, extends, one edge wall of the groove 23 being graduated as shown in Figure 1 for determining the initially set position of the pin 24 relative to the disk groove 23.

The mechanism for moving the shifter 8 and the tool 7 carried by the rest 6 includes a shaft 26 journaled transversely of the carriage 2 beneath the shifter 8, the shaft being rotated through the medium of the handle 27 carrying upon the inner end thereof a beveled pinion 28. The shaft 29 is journaled in the bracket table 11 adjacent the inner edge thereof as shown in Figure 1, the same having fixed upon the inner end thereof a beveled pinion 30 meshing with the pinion 28, the outer end of the shaft 29 carrying a gear 31. A shaft 32 having a longitudinally extending spline 33 is journaled on the bracket table 11 outwardly of and parallel with the shaft 29, the outer end of the shaft 32 carrying a gear wheel 34 in mesh with the gear 31. As shown in Figures 1 and 3, a worm 35 is keyed in the spline 33 of the shaft 32 and meshes with the spiral gear 36 depending from the disk 20 and extending into the annular groove or recess 18, the shaft 32 extending through the recess as illustrated.

In the operation of the device, as shown in Figure 1, the work 5 is mounted in the chuck 4 that is rotated in the usual manner. The arm extension 25 of the shifter 8 has the pin or key 24 carried by the outer end thereof positioned in the groove 23 at the desired calibration for cutting the desired arc of a curvature, the position of the pin 24 in the groove 23 being determined by shifting the plate 15 through the medium of the rod 16 and thereafter clamping the plate in a set position by the clamping device 17 engaging the lathe rail 1. The shaft 26 is power operated in the usual manner, but in close work the handle 27 upon the shaft 26 is operated by hand to rotate said shaft and through the meshing bevel pinion and gears, rotating the shaft 32, the worm 35 upon the shaft 32 engaging the worm gear 36 carried by the disk 20 to rotate the disk and move the shifter transversely of the lathe carriage 2 the disk simultaneously shifting the carriage 2 longitudinally of the lathe rails 1 to cause the tool 27 to cut a rounded concaved or convex surface upon the work 5. The direction of rotation of the disk 20 determines the character of the cut, i. e., whether or not the same is concaved or convexed. The worm 35 is in constant mesh with the worm gear 36 and movement of the plate 15 upon the bracket table 11 will shift the worm in the spline 33 of the shaft 32.

In the form of the invention shown in Fig. 2, the work 5ª is of elongated oval and cone-shaped formation, the same being supported in a rotatable chuck bore while the power devices and the shifter 8 is of similar construction to the form of the invention shown in Fig. 1. In Fig. 2, the shifter extension arm 37 carries a cross head 38 upon the outer end thereof that is transversely slotted as at 39 to receive an adjustable screw or plug 40 disposed in the transverse groove 23ª of the disk 20ª. The plate 15ª slidably mounted in the bracket table guide 13 carries another disk 41 similar to the disk 20ª with a screw pin or plug 42 adjustably secured in the transverse slot 43 of the disk 41. A bracket arm 44 is secured to one side of the lathe carriage 2 and carries an extension arm 45 provided with an elongated slot 46 into which the screw pin 42 extends, a separate worm upon the shaft 32 cooperating with the disk 41 to effect rotation thereof.

In the operation of the attachment as shown in Fig. 2, it being understood that the side walls of the grooves 23ª and 43 are provided with graduations, the pin 40 is disposed in the slot 23ª to control the length of transverse movement of the shifter 8 relative to the carriage 2, the pin 42 being disposed in the slot 43 of the disk 41 determining the length of movement of the carriage 2 upon the lathe rails 1. Assuming that the pin 40 is set at a position from the axis of the disk 20ª, one-half the distance of the setting of the pin 42 from the axis of the disk 41, the carriage 2 will be caused to travel longitudinally of the lathe rails 1, twice the distance of the transverse movement of the shifter 8 relative to the carriage, thus cutting a tapering cone-shaped surface having an arcuate length twice the distance of the diameter of the work. The disks 20ª and 41 rotate in the same direction, and rotation thereof may be reversed for cutting either concaved or convex surfaces, it being possible to accurately cut various designs of different curvature with this attachment.

When it is desired to use the lathe in the ordinary manner, as in directly moving the shifter 8 transversely of the carriage 2, for facing work with the carriage remaining stationary, the clamp 17 is disengaged from the lathe rail 1, and rotation of the shaft 26, will effect rotation of the disks 20 or 20ª, the plate 15 reciprocating upon rotation of the disks to compensate for the immovability of the carriage when the clamp is disconnected. It will therefore be seen, that the lathe with this improved attachment may be employed for cutting curved surfaces, and also used in the ordinary manner for direct transverse face cutting, to be controlled by the clamp 17.

While there are herein shown and described the preferred embodiments of the present invention, it is nevertheless to be understood that minor changes may be made therein without departing from the spirit and scope of the invention as claimed.

What is claimed as new is:—

1. An attachment for lathes comprising in combination with a lathe having track rails and a carriage slidably mounted thereon, a tool rest and shifter slidably mounted transversely of the carriage, a bracket table secured to one side of the carriage, a pair of rotatable disks adjustably supported on the bracket table, connections between the shifter, carriage and said disk, and means for rotating said disks to cause simultaneous movement of the shifter transversely of the carriage and movement of the carriage upon the lathe rails.

2. An attachment for lathes comprising in combination with a lathe having track rails and a carriage slidably mounted upon the rails, a tool rest and shifter slidably mounted transversely of the carriage, and means associated with the shifter and carriage for causing simultaneous movement of the shifter transversely of the carriage and sliding movement of the carriage upon the lathe rails.

3. An attachment for lathes comprising in combination with a lathe having track rails and a carriage slidably mounted upon the rails, a tool rest and shifter slidably mounted transversely of the carriage, and means associated with the shifter and carriage for causing simultaneous movement of the shifter transversely of the carriage and sliding movement of the carriage upon the lathe rails, said means being adjustable to permit various speeds of movement of the shifter relative to the carriage.

4. An attachment for lathes comprising in combination with a lathe having track rails and a carriage slidably mounted upon said rails, a tool rest and shifter slidably mounted transversely of the carriage, a bracket table supported by the rear side of the carriage, a slide adjustably mounted upon the bracket table, a rotatable disk upon the slide, said disk having a diametrical slot in its upper side, a rigid arm projecting rearwardly from the shifter and having a pin extending into the disk slot, a pair of gear connected shafts journaled on the bracket table, gear connections between one of the shafts and the disk and operating means for the other shaft.

5. An attachment for lathes comprising in combination with a lathe having track rails and a carriage slidably mounted upon said rails, a tool rest and shifter slidably mounted transversely of the carriage, a bracket table supported by the rear side of the carriage, a slide adjustably mounted upon the bracket table, a rotatable disk upon the slide, said disk having a diametrical slot in its upper side a rigid arm projecting rearwardly from the shifter and having a pin extending into the disk slot, a pair of gear connected shafts journaled on the bracket table, gear connections between one of the shafts and the disk, and manual and motor means associated with the other shaft for selective operation thereof.

In testimony whereof I affix my signature.

WILLIAM DZUS.